United States Patent
Stojek

[11] 3,929,395
[45] Dec. 30, 1975

[54] THRUST BEARING RETAINER

[75] Inventor: Dieter Stojek, Bergisch Gladbach, Germany

[73] Assignee: Ford Motor Company, Dearborn, Mich.

[22] Filed: Jan. 13, 1975

[21] Appl. No.: 540,760

[52] U.S. Cl. .................... 308/167; 308/23; 308/24
[51] Int. Cl.² .. F16C 3/06; F16C 9/02; F16C 13/04; F16C 35/00
[58] Field of Search ............... 308/23, 23.5, 24, 167

[56] References Cited
UNITED STATES PATENTS

| | | | |
|---|---|---|---|
| 919,700 | 4/1909 | Dodge | 308/23 X |
| 1,340,396 | 5/1920 | Martin | 308/167 |
| 1,825,410 | 9/1931 | Monckmeier | 308/167 |
| 2,552,166 | 5/1951 | Gardiner | 308/167 X |

FOREIGN PATENTS OR APPLICATIONS

| | | | |
|---|---|---|---|
| 806,373 | 12/1958 | United Kingdom | 308/167 |
| 1,353,265 | 1/1964 | France | 308/23 |

*Primary Examiner*—Robert J. Spar
*Assistant Examiner*—Howard Beltran
*Attorney, Agent, or Firm*—Roger E. Erickson; Keith L. Zerschling

[57] ABSTRACT

A half-ring type thrust bearing, retaining means and adjacent engine structure for the axial location of shafts in housings, particularly for the axial location of a crankshaft in an engine cylinder block. The thrust bearing is seated in a fully circular or annular recess and is prevented from rotating relative to the recess by the retaining means. The retaining means is positioned between the bearing web and the bearing cap and includes end elements which grip the bearing cap or web and engage the ends of the half to maintain its position.

5 Claims, 6 Drawing Figures

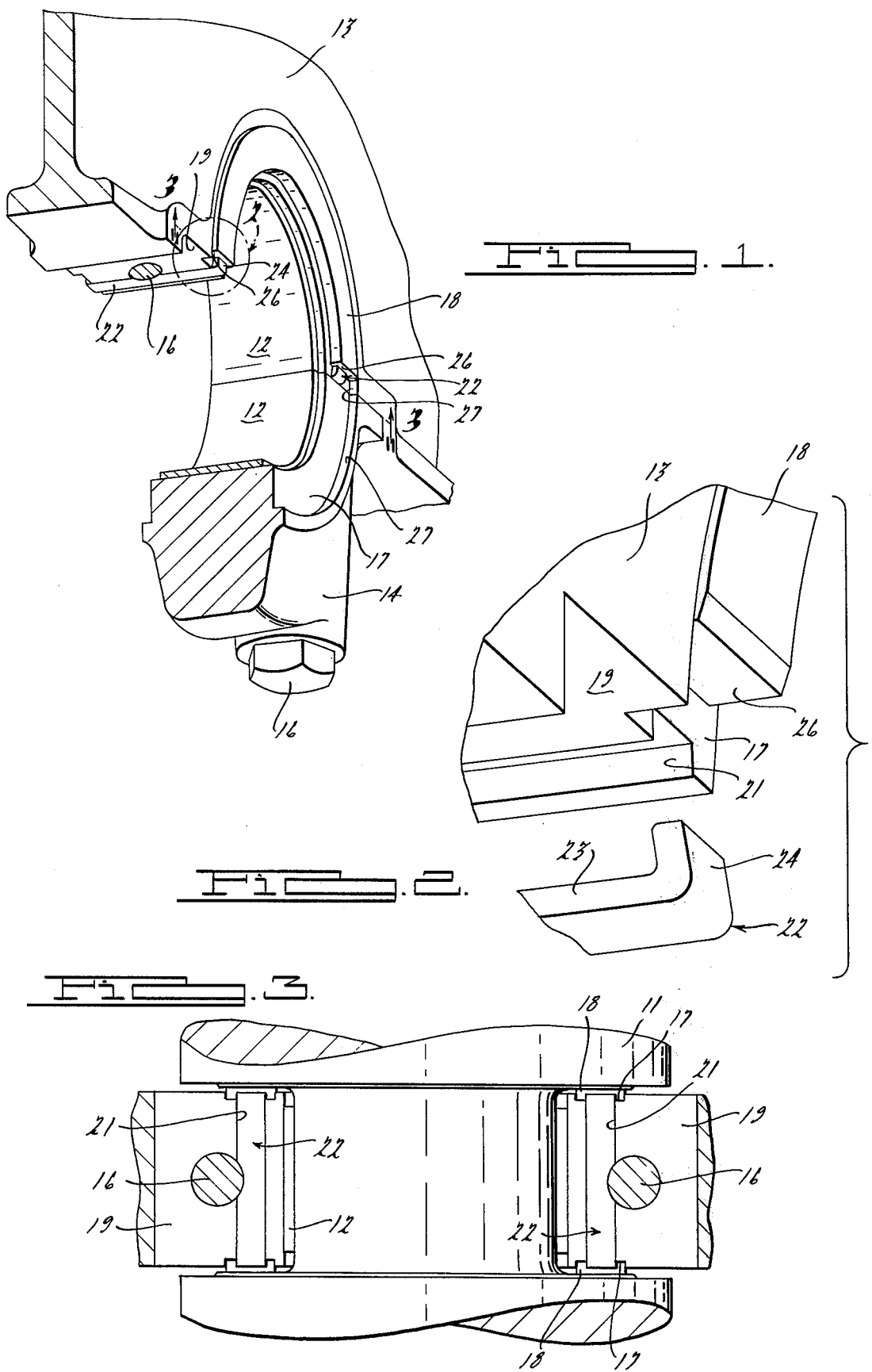

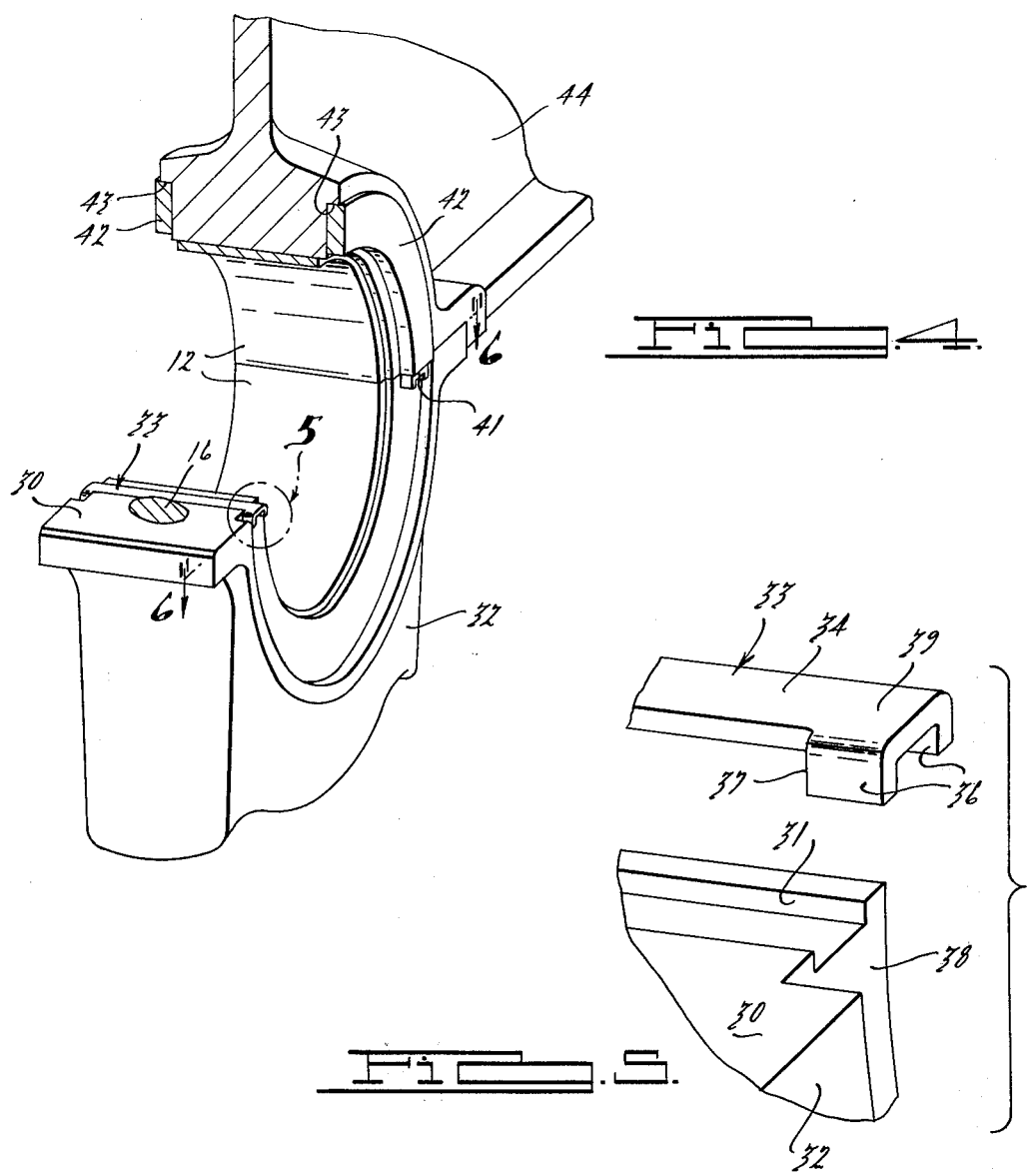
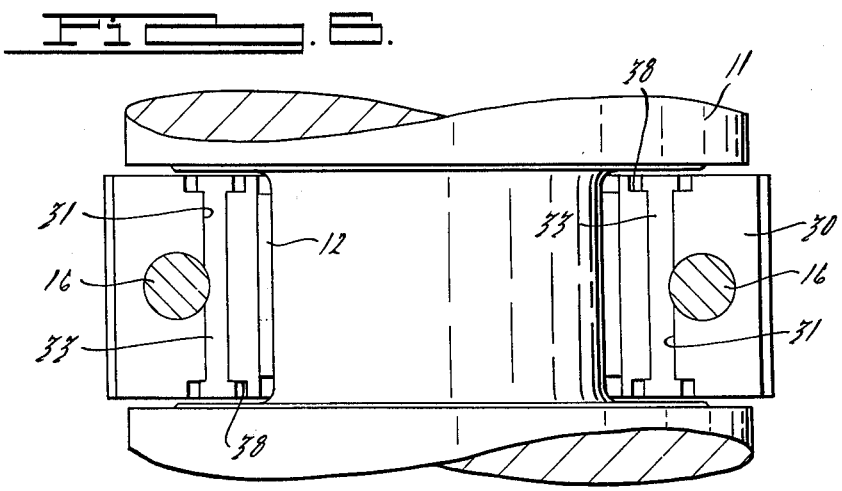

3,929,395

THRUST BEARING RETAINER

BACKGROUND AND SUMMARY OF THE INVENTION

In many known thrust bearing systems, particularly for internal combustion crankshafts, upper and lower half rings are assembled in an annular seat which is continuously machined in the bearing web and in the bearing cover or cap. Such thrust rings are secured against rotation by a tang or projection which extends radially into a notch in the bearing cap. With this arrangement, it has been found that substantially all of a given thrust loads is carried by only one of the two half-rings rather than being divided substantially equally between both half-rings. This concentration of loading on a single half-ring is particularly characteristic during the braking in period of the engine and results from the slight dissimilarities in the half rings as permitted by the normal engine tolerances. Attempts have, therefore, been made to provide only a single half ring thrust bearing at each side of the bearing so as to economize in the number of half-rings needed for an engine. To secure the half-ring bearings from rotation or displacement within the continuous circular seats, a projection or tang is provided in known bearings that extends from a central portion of the half-ring into a notch in the bearing cover. It was found, however, that such a half-ring still experiences shifting out of its circular seat and was displaced radially relative to the shaft resulting in wear at the radius edges of the bearing pin. These difficulties could have been resolved by providing half circle seats for the thrust bearing machined only in the bearing web and not in the bearing cover so that the bearing cover would have support of the half-ring at its two ends. However, machining a semi-circular seat is undesirable in that it would result in substantial changes to existing engine manufacturing machinery and in significant retooling costs.

An object of the present invention is to provide a half-ring thrust bearing arrangement which is reliably secured not only against rotation within the annular seat, but also against radial displacement or dropping out of the annular seat. It is also an object of this invention to provide an improved half-ring thrust bearing arrangement which is essentially simpler and more economical and which minimizes machining operations necessary for their arrangement on the bearing web or on the bearing cover.

These objects are achieved with the use of a spring clip whose base is received within a groove formed in the bearing web or the bearing cover and whose bent legs or end portions clamp against the bearing web or bearing cover, as the case may be, and support the split thrust ring within the annular seat.

An internal combustion engine constructed in accordance with this invention includes an engine block having crankshaft support means and a crankshaft mounted within the support means to rotate about a given axis. The crankshaft support means includes a web member and a cap member. The cap member separates from the web member along a plane which includes the axis of rotation of the crankshaft. The crankshaft and the support means have axially adjacent surfaces which are separated by the thrust bearing half-ring. The half-ring is received within an annular recess formed on each of the axial sides of the bearing support means. A pair of generally axially extending slots are formed in the mating surfaces of the web member or the cap member. A resilient clip is received within each slot an includes a pair of bent legs or ends that are positioned generally perpendicularly to the intermediate portion of the clip. The clip resiliently engages oppositely directed surfaces of the annular recesses and maintains each half-ring within its annular seat to prevent its rotation as well as its radial displacement within the seat.

It is the further object of this invention to provide a half-ring retaining means which assist in maintaining the half-ring in position during engine assembly.

BRIEF DESCRIPTION OF THE DRAWINGS

FIG. 1 of the drawings is a perspective view, with a portion broken away, of a crankshaft support means and bearing structure constructed in accordance with this invention.

FIG. 2 of the drawings is an enlarged exploded view of the encircled portion of FIG. 1.

FIG. 3 is a cross sectional view taken along lines 3—3 of FIG. 1.

FIG. 4 is a perspective view of a second embodiment of the invention.

FIG. 5 is an enlarged exploded view of the encircled portion of FIG. 4.

FIG. 6 is a cross sectional view taken along line 6—6 of FIG. 4.

DETAILED DESCRIPTION OF THE PREFERRED EMBODIMENTS

In FIGS. 1, 2 and 3, a crankshaft 11 is carried in semi-cylindrical plane bearings 12 by support means comprising a bearing web 13 of the engine block and a bear-cap 14 attached to the web by suitable threaded fasteners such as capscrews 16. The bearing support means extend generally perpendicularly to the axis of rotation of the crankshaft. On both axial sides of the bearing support means are formed circular or annular recessed seats 17 for centering and retaining half-ring thrust bearings 18. The bases of seats 17 are perpendicular to the crankshaft axis. Each seat is continuously and simultaneously machined on the web 13 and the cap 14 and is coaxial with bearings 18 and the crankshaft axis.

The bearing cap 14 adjoins the web 13 at surfaces 19 lying within a horizontal plane which includes the axis of rotation of the crankshaft 11. A pair of slots 21 are formed in surfaces 19 of the bearing web and extend in the axial direction of the crankshaft. The slots are formed on either side of the bearing opening and on the inside of cap screws 16. A generally U-shape clip or retaining means 22 is received within each slot 21. The clip includes a main portion 23 generally parallel to the horizontal axis contained within the slot and a pair of bent ends or legs 24 which resiliently grasp the axial thickness of the bearing cap and frictionally retains the clip within the slot 21. The ends of the bended legs 24 engage the ends 26 of the half-ring thrust bearing 18 and maintain the thrust bearing in position against the cylindrical circumferential walls 27 of the annular recess 17 and prevent the half-ring bearing from rotating within the annular recess.

It may be seen that the slot 21, the clip 22 and the half-ring 18 could be positioned in the bearing cap 14 as well as in the web member 13, as shown in the drawings. The bent legs 24 would then extend downwardly and the slots would be formed in adjoining surfaces of the bearing cap.

FIGS. 4, 5 and 6 illustrate a second embodiment of the invention. A pair of axially extending slots 31 are cut in the mating surfaces 30 of bearing cap 32. A retaining clip 33 is received within each slot and includes a main portion 34 confined within the slot and a pair of end portions overlapping the slot on either of the axial ends and including downwardly extending legs 36 having inner edges 37 engageable with the base of the annular recess 38 adjacent the slot. The legs extend downwardly in a plane generally perpendicular to the axis of rotation of the crankshaft. The pairs of legs on either end of the clip are spaced slightly less than the axial length of the slot 31 so that the clip 33 resiliently grips the bearing cap 32. The areas 39 of the clips engage the ends 41 of the half-ring thrust bearing 42 urging the thrust bearing into engagement with the cylindrical circumferential wall 43 of the annular recess and preventing the half-ring from rotation within the annular recess 38.

As in the previous embodiment, the slot 31, clip 33 or the half-ring may be located in either the bearing web 44 or the bearing cap 32.

In the embodiment shown in FIGS. 4, 5 and 6, the thrust bearings 42 are exactly 180 degrees half-rings. In the embodiment shown in FIGS. 1, 2 and 3, the thrust bearings 18 are somewhat more than 180 degrees to accommodate the legs 24 of clip 22.

Modifications and alteration will occur to those skilled in the art which are included within the scope of the following claims.

I claim:

1. Internal combustion engine structure including an engine block having crankshaft support means, a crankshaft mounted within said support means to rotate about a given axis, said crankshaft support means comprising a web member and a cap member, a pair of surfaces of said web member adjoining a pair of surfaces of said cap member at a plane which includes the axis of rotation of said crankshaft, said crankshaft and said support means having axially adjacent surfaces, thrust bearing means separating said axially adjacent surfaces, said surface on said bearing support means comprising an annular recess, each of said thrust bearing means comprising a partial annulus positioned between said adjacent surfaces, an axially extending slot formed in each of the adjoining surfaces of one of said members comprising said crankshaft support means, clip means including a portion received within said slot generally parallel to said plane, said clip means including a pair of end legs positioned generally perpendicularly to the slot received portion of said clip means, said end legs being received within said annular recess and engaging the ends of said partial annulus to prevent rotation of said partial annulus within said annular recess.

2. Structure according to claim 1, said clip means having generally a U-shape.

3. Structure according to claim 1, said slots being formed in said web means.

4. Structure according to claim 1, said slots being formed in said cap member.

5. Internal combustion engine structure including an engine block having crankshaft support means, a crankshaft mounted within said support means to rotate about a given axis, said support means comprising a web member and a cap member, a cylindrical bore formed in said support means to receive a portion of said crankshaft, said web member and said cap member each having a pair of adjoining surfaces lying in a plane which includes the axis of rotation of said crankshaft, said crankshaft and said support means having axially adjacent surfaces, said just-mentioned surfaces on said bear-support means comprising an annular recess formed on each axial side of said bearing support means, each said annulus recess having a web member portion and a cap member portion, thrust bearing means received in the web portions of said annular recesses and separating said axially adjacent surfaces, each said thrust bearing means comprising a partial annulus of less than 180°, axially extending slots formed in each of said adjoining surfaces of said web member, said slots having ends opening on said annular recesses, clip means received in each of said slots, each said clip means including a main portion received in said slot and end portions protruding from said slot and bent against said annular recess, each said annular recess having a radially outer cylindrical wall, said clip means engaging the ends of said partial annulus and maintaining said partial annulus in position against said radially outer cylindrical wall.

* * * * *